United States Patent
[11] 3,609,662

[72] Inventor David F. Grimm
St. Paul, Minn.
[21] Appl. No. 868,681
[22] Filed Oct. 23, 1969
[45] Patented Sept. 28, 1971
[73] Assignee Sperry Rand Corporation
New York, N.Y.

[54] SERIAL PULSE DIGITAL TRANSMISSION SYSTEM

3 Claims, 2 Drawing Figs.

[52] U.S. Cl. .......... 340/168, 178/69, 340/167
[51] Int. Cl. .......... H04q 1/32
[50] Field of Search .......... 340/168, 167 B; 178/69

[56] References Cited

UNITED STATES PATENTS 2,522,609 9/1950 Gloess .......... 340/167 B

*Primary Examiner*—Harold I. Pitts
*Attorneys*—Thomas J. Nikolai, Kenneth T. Grace and John P. Dority

ABSTRACT: A serial digital transmission system is described wherein the sending station is connected to a receiving station by way of a pair of conductors. Digital data in parallel form is applied as an input to a shift register at the transmitting station and the serialized information is shifted out of this register at a rate determined by a digital clock. Data signals of a first binary significance are applied to a first of the pair of conductors whereas digital signals of the opposite significance are applied to the second conductor. At the receiving point, a pair of differential amplifiers are connected to the transmission line to receive the digital signals. The outputs from the pair of digital amplifiers are connected to a NAND logic circuit which serves to reconstitute the clock. The output from one of the differential amplifiers at the receiver is connected to the serial data input terminal of a receiving shift register and digital data appearing on this line is entered into the shift register at a rate determined by the reconstituted clock signal to make available at the output of the shift register a digital word in parallel form.

INVENTOR
DAVID F. GRIMM
BY Thomas L. Nikolai
ATTORNEY

SERIAL PULSE DIGITAL TRANSMISSION SYSTEM

BACKGROUND OF THE INVENTION

In many digital transmission systems where speed of data transfer is of paramount importance, parallel transmission is employed to transfer an entire word in binary code over a plurality of lines to a receiving point. However, in many applications where speed of transmission is not the prime consideration, parallel transmission of digital data would be wasteful in terms of the number of conductors employed and the cost of stringing such a communication path. In these applications, it is substantially more practical to employ a serial transmission system whereby digital information is transmitted over a single pair of lines in serial fashion at a rate determined by a suitable clock.

The preferred embodiment of the present invention constitutes such a serial transmission system. Specifically, the present invention is directed to a serial interface arrangement which may be utilized between digital devices not having a common ground, such as between a computer and its associated peripheral gear, especially where the organization is such that the devices are separated by some distance rather than being contained within a single chassis. By employing the transmission system of the present invention, economies are effected in the amount of wire employed, thus resulting in a reduction in the size and weight of the system. Further, the integrated circuit drivers at the sending site and the receivers at the receiving site present a nearly balanced load to each other, thereby providing excellent immunity to electromagnetic noise which may be induced in the transmission lines, without the use of extensive shielding or compensating transformers. Included in the present invention are high-speed, monolithic line drivers and line receivers which transmit and receive data over a "twisted pair" transmission line. The circuits are designed such that data can accurately be transmitted in a noisy environment and with relatively large voltage differences in equipment grounds.

The design is based on the premise that if two electrically balanced lines are located in an identically noisy environment, the coupled noise on both lines is identical. Therefore, by providing a receiver designed to detect only the difference signal of a balanced twisted pair, the detected signal will be relatively free of noise.

Accordingly, it is a primary object of the present invention to provide an improved serial transmission system for digital data.

Another object of the invention is to provide a serial digital transmission system which is highly immune to noise.

Still another object of the invention is to provide a serial transmission system employing integrated circuits throughout.

These and other objects of the invention will become apparent from a reading of the following specification. For a better understanding of the construction and mode of operation, reference is made to the accompanying drawings in which:

FIG. 1 illustrates a schematic diagram of the preferred embodiment of the present invention and FIG. 2 illustrates typical waveforms observable at various points in the circuit in FIG. 1 when digital data is being transmitted.

DESCRIPTION OF THE PREFERRED EMBODIMENT

Figure 1:
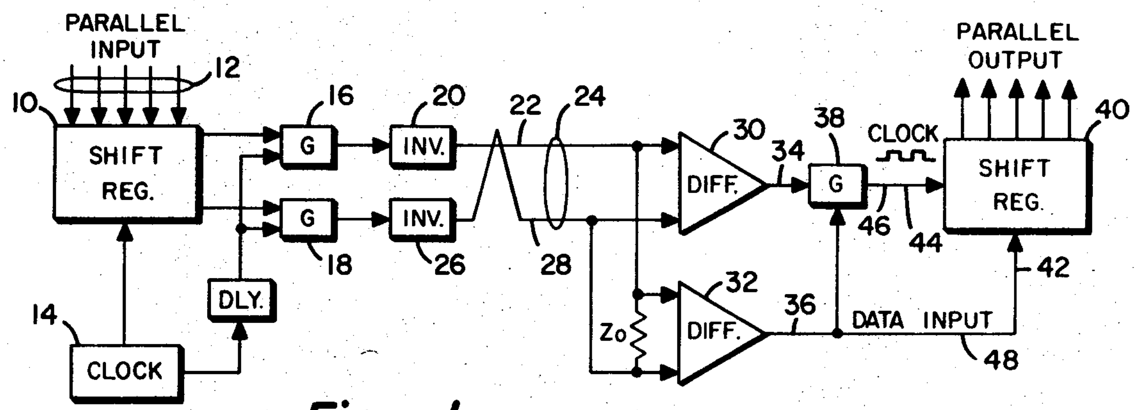

Referring now to FIG. 1, there is illustrated a schematic diagram of the preferred embodiment of the invention.

In this arrangement a shift register 10 is located at a sending site and is adapted to receive digital data in parallel form on the parallel input lines 12. Also connected to the shift register 10 is a source of regularly occurring timing signals from a clock circuit 14. The shift register 10 may be the Type 9300 shift register manufactured and sold by Fairchild Semiconductor Company. This is an integrated circuit shift register which is commercially available and which provides a pair of output terminals. A first data output terminal of shift register 10 is connected through a NAND gate 16 and an inverting amplifier or driver 20 to a first conductor 22 of a twisted pair transmission line indicated generally by the numeral 24. Similarly, the second or the complement output terminal of the shift register 10 is connected by way of a NAND gate 18 and an inverting amplifier 26 to the conductor 28 to the twisted pair 24.

The transmission line 24 may be of considerable length and at the receiving station is connected in parallel to the inputs of a pair of differential receivers 30 and 32. The output terminals 34 and 36 of these differential receivers are connected to the input terminals of a NAND logic circuit 38. Also located at the receiving point is a shift register 40 having a data input terminal 42 and a clock signal input terminal 44. The clock circuit input terminal 44 is connected to the output terminal of NAND circuit 38 by way of a conductor 46. The data input terminal 42 of the shift register 40 is connected to the output terminal of differential receiver 32 by way of a conductor 48.

The twisted pair transmission line 24 is terminated by an impedance $Z_0$ equal to the characteristic impedance of the line to minimize reflections.

OPERATION

Figure 2:
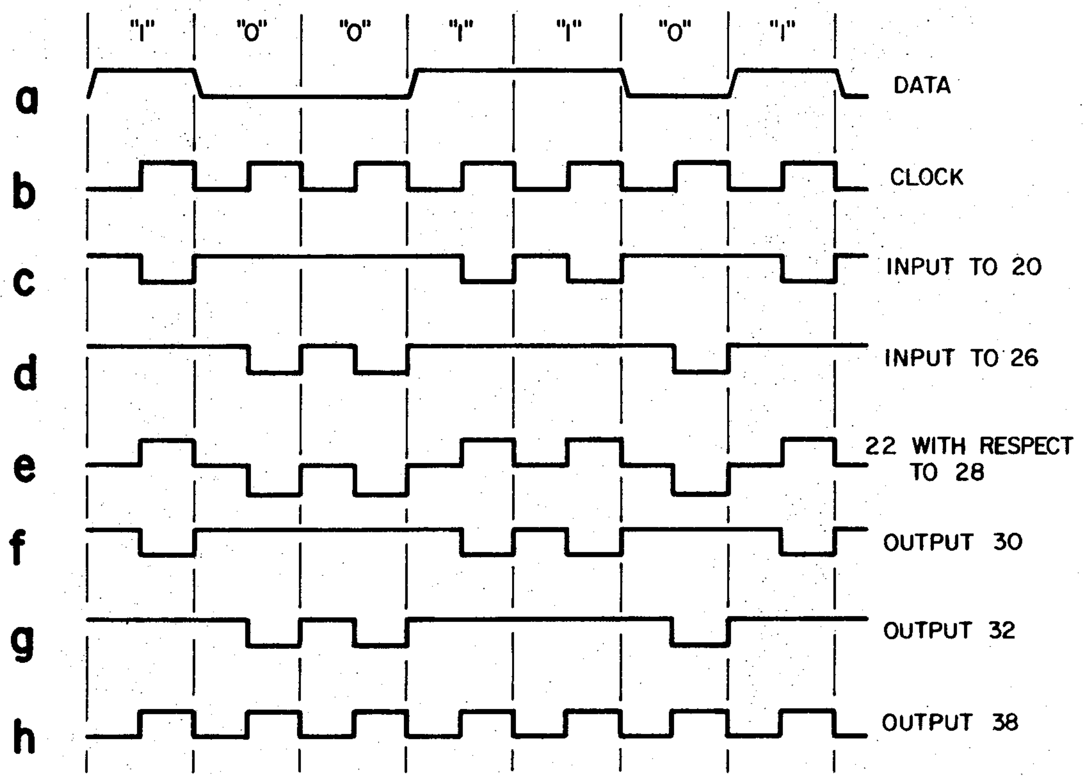

Now that the construction and interconnection of the preferred embodiment has been described, consideration will be given to its operation. In this regard, reference is made to the waveforms illustrated in FIG. 2 which show the signals appearing at various points in the circuit of FIG. 1 when the digital word 1001101 is transmitted in serial fashion. Specifically, waveform a in FIG. 2 illustrates the pattern of the data to be transmitted with a positive going excursion indicative of a binary "1" signal and a negative going excursion indicative of a binary "0" signal. Waveform *b* in FIG. 2 illustrates the output signals from the clock network 14 which are applied to the clock input terminal of the shift register 10. The application of these clock signals cause the digital data to be transmitted to be stepped out of the shift register in a conventional fashion. Waveform *c* in FIG. 2 illustrates the input applied to the driver circuit 20. Similarly, waveform *d* in FIG. 2 illustrates the signals applied as an input to the driver 26. It is to be especially noted that with the arrangement employed binary signals of a first significance (binary 1) are applied to driver 20 whereas signals of the opposite binary significance (binary 0are applied to the driver 26.

Waveform *e* FIG. 2 illustrates the voltage appearing on line 22 with respect to that appearing on line 28 at all of the clock signal times occurring during the serial transmission of the aforementioned data pattern. This waveform is applied as an input to the differential receiver circuits 30 and 32. In the preferred embodiment of this invention, when the voltage applied to the plus (+) input of an amplifier 30 or 32 exceeds that on the minus (−) input by approximately 1.5 volts, then the output of the amplifier approaches 0 volts. Keeping this in mind, it can be seen that waveform *f* in FIG. 2 represents the output signal which would appear at the output of the differential receiver 30. Specifically, whenever the signal, (waveform *3*) applied to the differential receiver tends to exceed 1.5 volts in the positive direction, the output from the differential receiver 30 approaches a O volt level.

The polarity markings on the differential receiver 32 indicate that this receiver is connected in opposite fashion to the twisted pair transmission line than is the receiver 30. As such, waveform *g* represents the signals which will appear at the output of the differential receiver 32. Thus, whenever the voltage on conductor 22 exceeds the 1.5 volt threshold in the negative direction, the output signal from differential receiver 32 goes toward ground or 0 volt level.

The waveforms *f* and *g* of FIG. 2 are applied as inputs to the NAND circuit 38. NAND circuit 38 is operative to produce a "0" signal whenever both of the inputs there to are simultaneously "1" signals. If either of the input signals is a "0," then the output from the NAND circuit 38 will be a "1" signal. Waveform *h* in FIG. 2 illustrates the output from NAND circuit 38. When this waveform is compared to that of waveform *b*, it can be seen that the two are the same. This reconstituted clock signal appearing on the conductor 46 when applied to the clock input terminal 44 of the shift register 40 serves to step the digital data appearing on the data input terminal 42 into the shift register stages. Since the data input terminal is connected by way of conductor 48 to the output of differential receiver 32, it can be seen that at sequentially occurring clock pulse time, the digital word 1001101 will be stepped into the shift register 40. This, of course, is identical to the bit pattern transmitted out of the shift register 10.

The differential receivers 30 and 32 are preferably integrated circuits of the type presently manufactured and sold by Texas Instruments, Inc. (Part No. S. N. 2300) or Raytheon Co., Components Division (part No. R. M. 7008). As such these line receivers are designed to operate with up to plus or minus 5 volts of common mode noise or ground difference between the driving and receiving grounds.

Because the binary 1's and 0's are separated by the receivers 30 and 32, a much simpler scheme of decoding is achieved when compared to prior art methods which employ pulse width modulation, pulse phase modulation and the like wherein after receiving the data, a fairly lengthy decoding process is required to transform the data back into the correct form. The present invention, on the other hand, provides the information in the proper form immediately upon the output from receivers 30 and 32.

Thus it can be seen that I have provided a new and improved serial digital data transmission system. The scope of my invention is to be determined from the appended claims.

What is claimed is:

1. Apparatus for transmitting digital data pulses from a transmitting site to a receiving site in serial fashion, comprising:

first and second conductors connected between said transmitting site and said receiving site:

means at said transmitting site for applying pulses of a first binary significance to said first conductor and pulses of the opposite binary significance to said second conductor at a predetermined rate;

first and second differential amplifiers, each having a pair of input terminals and an output terminal at said receiving site means connecting the first input terminal of said first differential amplifier and the second input terminal of said second differential amplifier to said first conductor and the second input terminal of said first differential amplifier and the first input terminal of said second differential amplifier to said second conductor;

NAND circuit means connected to said output terminals of said first and second differential amplifiers;

shift register means having a data input terminal and a clock input terminal and means connecting the output of said NAND circuit to said clock input terminal and the output of said second differential amplifier to said data input terminal.

2. Apparatus as in claim 1 wherein said means at said transmitting site includes shift register means adapted to receive digital data signals in parallel and a clock signal and having its output connected to said first and second conductors, such that data pulses of a first binary significance are serially applied to said first conductor and data pulses of a second binary significance are serially applied to said second conductor at a rate determined by said clock signal.

3. Apparatus as in claim 2 and further including first and second pulse amplifiers interposed between the output of said shift register means and said first and second conductors.